United States Patent
Hill et al.

(10) Patent No.: US 9,737,880 B2
(45) Date of Patent: Aug. 22, 2017

(54) PHOTOCATALYTIC POLYOXOMETALATE COMPOSITIONS OF TUNGSTOVANADATES AND USES AS WATER OXIDATION CATALYSTS

(71) Applicant: EMORY UNIVERSITY, Atlanta, GA (US)

(72) Inventors: Craig L. Hill, Atlanta, GA (US); Iourii V. Gueletii, Decatur, GA (US); Jie Song, Atlanta, GA (US); Hongjin Lv, Atlanta, GA (US); Djamaladdin Musaev, Atlanta, GA (US); Zhen Luo, Atlanta, GA (US)

(73) Assignee: Emory University, Atlanta, GA (US)

( * ) Notice: Subject to any disclaimer, the term of this patent is extended or adjusted under 35 U.S.C. 154(b) by 286 days.

(21) Appl. No.: 14/387,745

(22) PCT Filed: Mar. 28, 2013

(86) PCT No.: PCT/US2013/034340
§ 371 (c)(1),
(2) Date: Sep. 24, 2014

(87) PCT Pub. No.: WO2013/148996
PCT Pub. Date: Oct. 3, 2013

(65) Prior Publication Data
US 2015/0298100 A1  Oct. 22, 2015

Related U.S. Application Data

(60) Provisional application No. 61/616,500, filed on Mar. 28, 2012.

(51) Int. Cl.
*B01J 23/888* (2006.01)
*B01J 23/75* (2006.01)
(Continued)

(52) U.S. Cl.
CPC ............ *B01J 23/888* (2013.01); *B01J 23/75* (2013.01); *B01J 31/1815* (2013.01);
(Continued)

(58) Field of Classification Search
CPC ...... B01J 23/84; B01J 23/847; B01J 23/8472; B01J 23/888; B01J 37/04
See application file for complete search history.

(56) References Cited

U.S. PATENT DOCUMENTS

| | | | |
|---|---|---|---|
| 2005/0112055 A1 | 5/2005 | Shannon | |
| 2012/0027666 A1 | 2/2012 | Hill | |

FOREIGN PATENT DOCUMENTS

| | | | |
|---|---|---|---|
| WO | 2010/107919 | 9/2010 | |
| WO | WO 2010107919 A1 * | 9/2010 | ............ B01J 23/002 |

OTHER PUBLICATIONS

Li et al., "Synthesis, crystal structure, and properties of two sandwich-type tungstovanadates," Inorganica Chimica Acta, 2009, vol. 362, pp. 2796-2801.*

(Continued)

*Primary Examiner* — Nicholas A Smith
(74) *Attorney, Agent, or Firm* — Emory Patent Group

(57) ABSTRACT

This disclosure relates to photocatalytic polyoxometalate compositions of tungstovanadates and uses as water oxidation catalysts. In certain embodiments, the disclosure relates to compositions comprising water, a complex of a tetrametal oxide cluster and $VW_9O_{34}$ ligands, and a photosensitizer. Typically, the metal oxide cluster is Co. In certain embodiments, the disclosure relates to electrodes and other devices comprising water oxidation catalysts disclosed herein and uses in generating fuels and electrical power from solar energy.

17 Claims, 3 Drawing Sheets

(51) Int. Cl.

| | | |
|---|---|---|
| B01J 37/04 | (2006.01) | |
| C25B 1/04 | (2006.01) | |
| C25B 11/04 | (2006.01) | |
| B01J 35/00 | (2006.01) | |
| C25B 1/00 | (2006.01) | |
| C01G 51/00 | (2006.01) | |
| C25B 9/08 | (2006.01) | |
| H01G 9/20 | (2006.01) | |
| B01J 31/18 | (2006.01) | |
| B01J 27/188 | (2006.01) | |

(52) U.S. Cl.
CPC .......... *B01J 35/004* (2013.01); *B01J 37/04* (2013.01); *C01G 51/006* (2013.01); *C25B 1/003* (2013.01); *C25B 1/04* (2013.01); *C25B 9/08* (2013.01); *C25B 11/0452* (2013.01); *C25B 11/0468* (2013.01); *H01G 9/2027* (2013.01); *H01G 9/2031* (2013.01); *B01J 27/188* (2013.01); *B01J 35/0013* (2013.01); *B01J 35/0033* (2013.01); *B01J 2523/00* (2013.01); *B01J 2531/74* (2013.01); *B01J 2531/821* (2013.01); *Y02P 20/134* (2015.11)

(56) References Cited

OTHER PUBLICATIONS

Fujishima et al., Electrochemical Photolysis of Water at a Semiconductor Electrode, Nature vol. 238 Jul. 7, 1972.
Huang et al. Spectroscopic Studies of Light-driven Water Oxidation Catalyzed by Polyoxometalates, Ind. Eng. Chem. Res. 2012, 51, 11850-11859.
Li et al. Synthesis, crystal structure, and properties of two sandwich-type tungstovanadates, Inorganica Chimica Acta 362 (2009) 2796-2801.
Li et al. Rare Sandwich-Type Polyoxomolybdates Constructed from Di-/Tetra-Nuclear Transition-Metal Clusters and Trivacant Keggin Germanomolybdate Fragments, Inorg. Chem. 2009, 48, 9819-9830.
Lv et al. Polyoxometalate water oxidation catalysts and the production of green fuel, Chem. Soc. Rev., 2012, 41, 7572-7589.
Wang et al. Structurally ordered intermetallic platinum-cobalt core-shell nanoparticles with enhanced activity and stability as oxygen reduction electrocatalysts, Nature Materials, vol. 12, 2013, 81-87.
Youngblood et al. Photoassisted Overall Water Splitting in a Visible Light-Absorbing Dye-Sensitized Photoelectrochemical Cell, J. Am. Chem. Soc. 2009, 131, 926-927.

\* cited by examiner

PHOTOCATALYTIC POLYOXOMETALATE COMPOSITIONS OF TUNGSTOVANADATES AND USES AS WATER OXIDATION CATALYSTS

CROSS REFERENCE TO RELATED APPLICATIONS

This application claims priority to U.S. Provisional Application No. 61/616,500 filed the Mar. 28, 2012, hereby incorporated by reference in its entirety.

STATEMENT REGARDING FEDERALLY FUNDED RESEARCH

This invention was made with government support under grant number DEFG02-03ER15461, awarded by the U.S. Department of Energy. The government has certain rights in the invention.

BACKGROUND

The direct harvesting, conversion, and storage of solar energy in chemical bonds is a promising approach for meeting the global demand for clean energy. Efficient sunlight driven water splitting remains one of the most desirable ways to store energy by forming energy dense $H_2$. See Fujishima & Honda, Nature, 1972, 238, 38-39. The splitting of $H_2O$ consists of two half reactions: water oxidation to form $O_2$ and water reduction to form $H_2$.

It is frequently straightforward experimentally to increase the thermodynamic driving force for a catalyzed process by increasing the external bias (potential) on the working electrode or use of a more potent reagent in chemical reactions. At some point increasing the additional driving force will overcome the activation energy of the rate-limiting step and reaction will proceed. For electrochemical processes, this additional driving force is termed the overpotential. Catalysis is most important and most relevant when the rate accelerations are seen under conditions with little or no externally applied driving force. Thus, there is a need for oxidation catalysts (WOCs) and other multi-electron-transfer catalysts that are effective at minimal overpotentials.

Carbon ligand based WOCs are prone to degradation in the presence of $O_2$ in the air where catalysts succumb to inactivation by ligand oxidation. Coordination compound WOCs are also susceptible to hydrolysis. Polyoxometalates POM systems are distinct and attractive water oxidation catalyst (WOC) because they are water soluble, oxidatively resistant, and hydrolytically stable in certain pH ranges. See Lv et al., Chem. Soc. Rev., 2012, 41, 7572-7589.

Yin et al. report soluble water oxidation catalyst with polytungstate ligands. See Science, 2010, 328 (5976): 342-345. Stacke and Finke report electrocatalytic water oxidation with a heterogeneous $CoO_x$ catalyst derived from polyoxometalates. Li et al. report the synthesis, crystal structure, and properties of two sandwich-type tungstovanadates. See Inorganica Chimica Acta, 2009, 362:2796-2801. See also WO2010/107919.

References cited herein are not an admission of prior art.

SUMMARY

This disclosure relates to photocatalytic polyoxometalate compositions of tungstovanadates and uses as water oxidation catalysts. In certain embodiments, the disclosure relates to compositions comprising water, a complex of a tetra-metal oxide cluster and $VW_9O_{34}$ ligands, and a photosensitizer. Typically, the metal oxide cluster is Co. In certain embodiments, the disclosure relates to electrodes and other devices comprising water oxidation catalysts disclosed herein and uses in generating fuels and electrical power from solar energy.

In certain embodiments, the photosensitizer is a ruthenium complex, quantum dot, or other metallic nanostructure. In certain embodiments, the ruthenium complex comprises a tris-bidentate ligand complex. In certain embodiments, compositions disclosed herein further comprising a compound that acts as an electron acceptor such as persulfate.

In certain embodiments, the disclosure relates to a photoelectrochemical cell comprising: a) a first electrode, b) a photosensitizer, c) a complex of a tetra-metal oxide cluster and $VW_9O_{34}$ ligands, and d) a second electrode. Typically, the metal is Co.

In certain embodiments, the first electrode comprises a semiconductor metal oxide such as $TiO_2$, $Fe_2O_3$, or $WO_3$. In certain embodiments, the second electrode comprises a water reduction catalyst comprising Pt. In certain embodiments, the photosensitizer is ruthenium complex, quantum dot, nanostructure, or multicomponent nanostructure. In certain embodiments, the ruthenium complex is a tris-bidentate ligand complex.

In certain embodiments, the disclosure contemplates method of oxidizing water comprising exposing a composition disclosed herein or an electrochemical cell disclosed herein to electromagnetic radiation, e.g., visible light, under conditions such that oxygen is formed. In certain embodiments, oxygen and hydrogen are formed.

In certain embodiments, the disclosure relates to processes for preparing a complex of a tetra-metal oxide cluster and $VW_9O_{34}$ ligands comprising mixing $M(NO_3)_2$, $WO_4^{2-}$ salts and $VO_3^-$ salts, under conditions such that of a tetra-metal oxide cluster and $VW_9O_{34}$ ligands is formed wherein M is a metal such as Co.

In certain embodiments, the disclosure relates to complexes of a tetra-metal oxide cluster and $VW_9O_{34}$ ligands made by the processes disclosed herein.

DETAILED DISCUSSION

Figure 1:
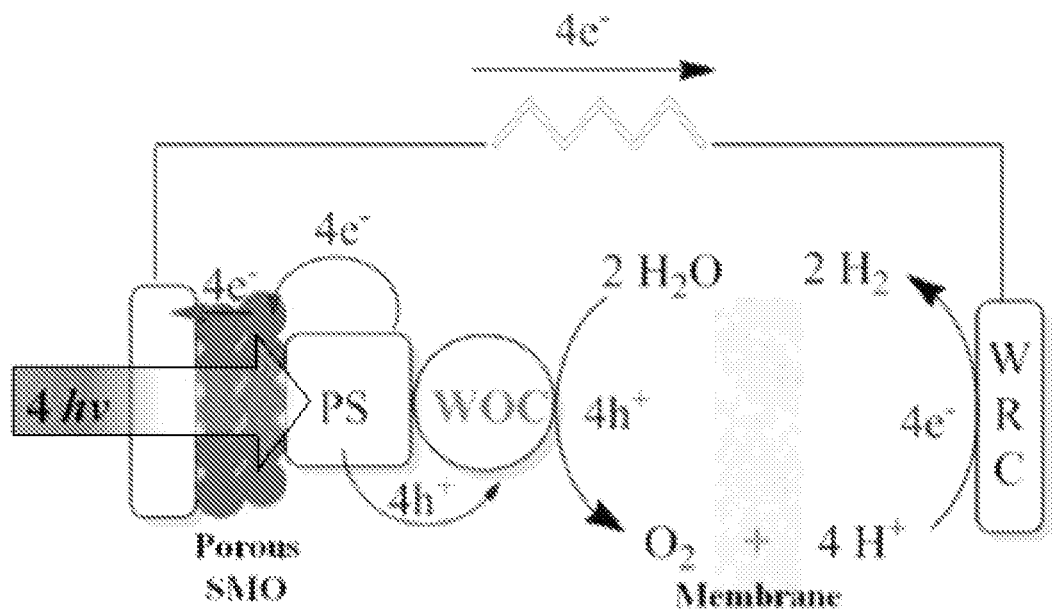
FIG. 1 illustrates a schematic representation for a typical light-driven water splitting photo-electrochemical cell. Notations: SMO, semiconductor metal oxide; PS, photosensitizer; WOC, water oxidation catalyst; WRC, water reduction catalyst.
Figure 2:
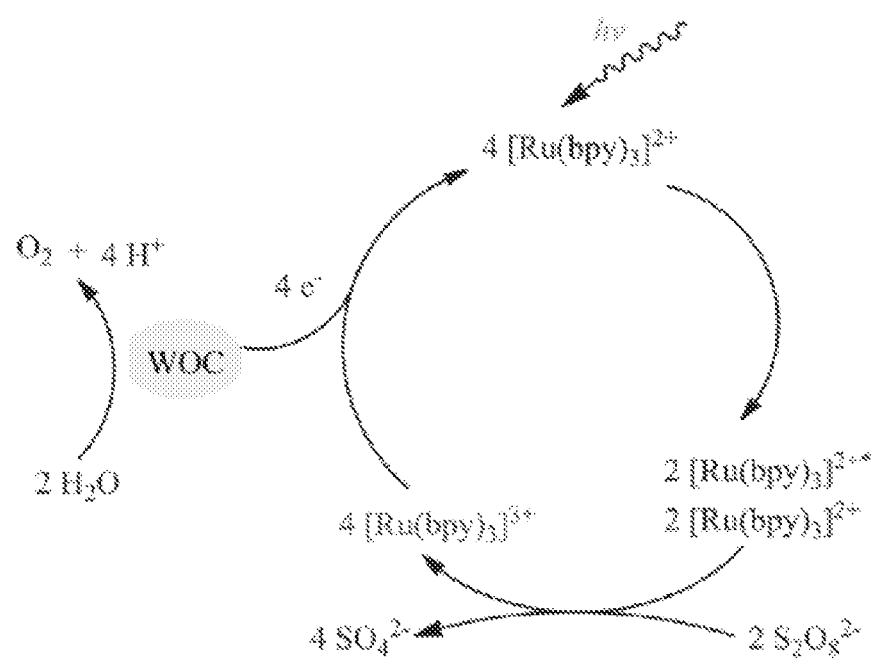
FIG. 2 schematically illustrates a light-driven water oxidation system with a water oxidation catalyst (WOC) and light absorbing photosensitizer, $Ru(bpy)_3$. The triplet metal (Ru)-to-ligand (bpy) charge transfer (3MLCT) excited state, $[Ru(bpy)_3]^{2+*}$, is believed to be quenched by $S_2O_8^{2-}$ through both bimolecular and unimolecular processes generating $[Ru(bpy)_3]^{3+}$ and $SO_4^{2-}$. The latter radical subsequently oxidizes a second $[Ru(bpy)_3]^{2+}$ to $[Ru(bpy)_3]^{3+}$ quantitatively. The photogenerated $[Ru(bpy)_3]^{3+}$ then functions as the oxidant for water oxidation.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise.

As used herein, the term "metallic nanostructure" refers to metals and semiconductor materials that are less than 200 nm in size in one direction. For example, a quantum dot is typically a metallic crystal with a maximum width of less than 50 nm, typically about 20 to 2 nm. Metallic nanostructures or quantum dots may have one or more layers of the same or different metals, oxides, sulfides, or combinations thereof, and may be of different geometries, e.g., substantially circular, cubs, rods, or tetrapods. Nanostructures are contemplated to include rods, tubes, and wires that propagate directionally with a length of more than 200 nm. Nanostructures are contemplated to include hollow structures.

Complexes of a Tetra-Metal Oxide Cluster and [VW$_9$O$_{34}$]$^{9-}$ Ligands

The synthesis of Na$^{10}$[Co$_4$(H$_2$O)$_2$(VW$_9$O$_{34}$)$_2$] (1-V2) has been improved and the X-ray crystallographic and magnetic characterization of this complex is provided herein.

Figure 3A:
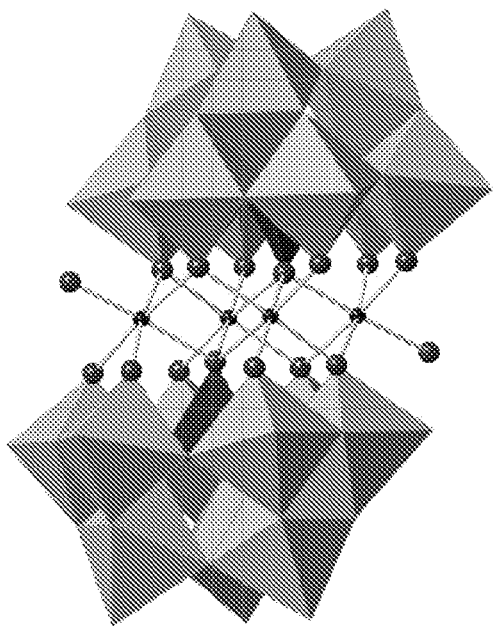
FIG. 3 shows an X-ray crystal structure of 1-V2 in combined ball-and-stick and polyhedral representations. Red: oxygen; Blue: cobalt; Yellow: vanadium; Gray: tungsten.
Figure 3B:
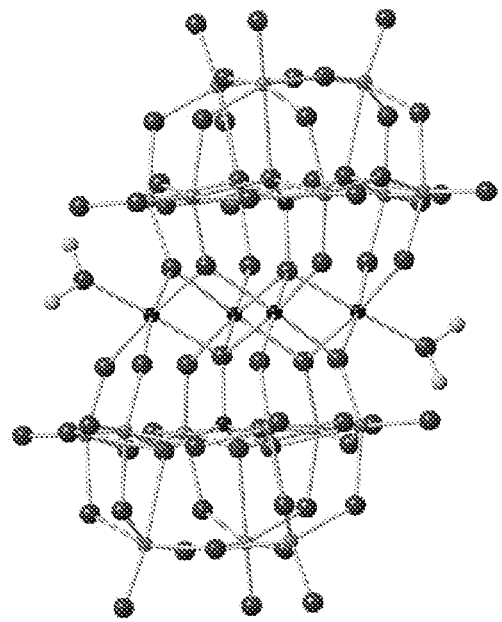

Complex 1-V2 (FIG. 3) is indeed isostructural to its phosphorus-containing analogue. In both complexes, two trilacunary Keggin-type [XW$_9$O$_{34}$]$^{9-}$ (X=P or V) ligands sandwich a tetra-cobalt cluster [Co$_4$O$_x$]. Two of the Co(II) centers on the outside positions in this central unit are solvent accessible and consequently bear one terminal aqua (water) ligand each. The VO$_4$ unit in each [VW$_9$O$_{34}$]$^{9-}$ ligand has an approximately tetrahedral structure. Both 1-V2 and 1-P2 have a 10-charge and the same metal-oxygen connectivity. The R value of 2.43% for our X-structure of K10 1-V2, the potassium salt of 1-V2, is one of the lowest ever reported for a polyoxometalate, facilitating location of the hydrogens on the cobalt terminal aqua ligands. The $^{51}$V NMR spectrum of 1-V2 shows only one peak at 120.8 ppm (Δν½=30.5 Hz) for the central pseudo tetrahedral V in the two symmetry-equivalent [VW$_9$O$_{34}$]$^{9-}$ ligands which is consistent with a solution structure for 1-V2 that is identical to the X-ray structure.

Efficiency of Water Oxidation Catalysts WOC

Figure 4:
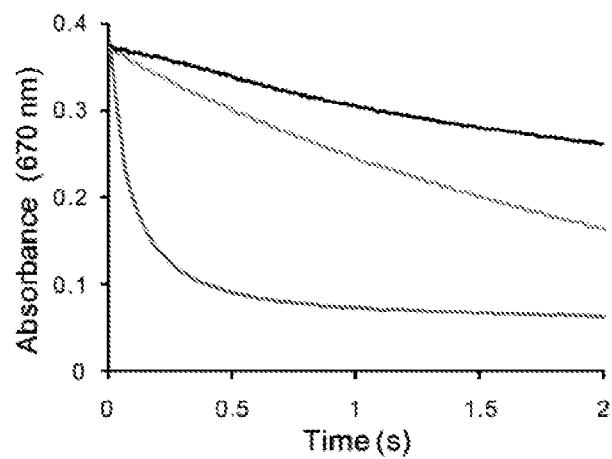
FIG. 4 shows data on the kinetics of $[Ru(bpy)_3]^{3+}$ reduction to $[Ru(bpy)_3]^{2+}$ measured as the decrease in absorbance at 670 nm. Non-catalytic reactions (black line: no catalyst), 1-P2 (light-green line), and 1-V2 (blue line). Conditions: 1 µM catalyst, 1 mM [Ru(bpy)$_3$]$^{3+}$, 80 mM sodium borate buffer at pH 9.0, 298 K.

The catalytic efficiency of 1-V2 and 1-P2 for water oxidation was evaluated using [Ru(bpy)$_3$]$^{3+}$ as a stoichiometric oxidant by following the kinetics of [Ru(bpy)$_3$]$^{3+}$ (ε670=420 M$^{-1}$ cm$^{-1}$) consumption in 80 mM borate buffer at pH 9.0 using the stopped-flow technique (FIG. 4). The kinetics are not exponential, and ~50% conversion of [Ru(bpy)$_3$]$^{3+}$ in 80 mM borate buffer at pH 9.0 is achieved: (a) ca. 30 s in the absence of catalyst, (b) 1 s with 1 µM 1-P2, and (c) 0.07 s with 1 µM 1-V2. The turnover frequency in the presence of 1-V2 defined as the initial rate of O$_2$ formation per catalyst concentration or (4[Ru$^{3+}$(bpy)$_3$]/dt)/[cat] is ca. 1×10$^3$ s$^{-1}$. This definition of TOF, following the common practice of the field, appears as an experimental-condition-dependent quantity and does not fully characterize the catalytic activity of a given material. Analysis of kinetics of catalytic [Ru(bpy)$_3$]$^{3+}$ decay shows that the reaction can be described by the mechanism similar to the classical Kok cycle in Photosystem II (PSII). The fitting of the [Ru(bpy)$_3$]$^{3+}$ decay kinetics reveals that the oxidation potential to remove the 4th electron from 1-V2 is ~1.3 V (NHE) and the TOF$_{max}$~4.8×10$^3$ s$^{-1}$, which is higher than the similar number for OEC in PSII (ca 10$^3$ s$^{-1}$). The rates for a multi-electron-transfer process for two different catalysts cannot be compared quantitatively unless overpotentials for both catalysts are known and comparable. The overpotential required for 1-V2 to achieve the TOF$_{max}$ is significantly higher than for the OEC; nonetheless the observed rates for 1-V2 under the conditions here are close to that of OEC and far beyond anything reported to date.

Figure 5:
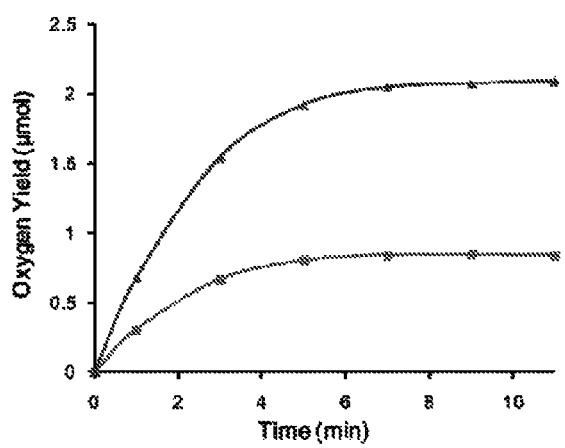
FIG. 5 shows data on the kinetics of light-driven catalytic O$_2$ evolution from water. Conditions: 455 nm LED light (17 mW, beam diameter ~0.5 cm), 1.0 mM [Ru(bpy)$_3$]Cl$_2$, 5.0 mM Na$_2$S$_2$O$_8$, 1.0 µM 1-V2: (blue curve) or 1.0 µM 1-P2 (light-green curve), initial pH 9.0, total volume 2.0 mL.
Figure 6:
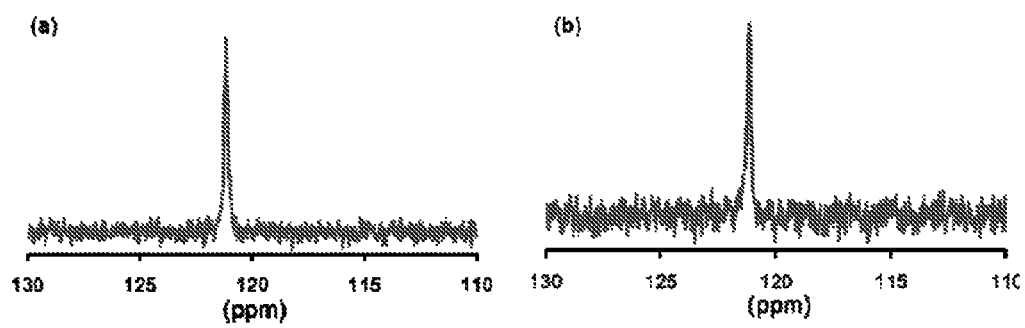
FIG. 6 shows $^{51}$V-NMR for 1-V2 (a) before and (b) after the light-driven catalytic water oxidation. Conditions: 455 nm LED light (17 mW, beam diameter ~0.4 cm), 33.3 µM [Ru(bpy)$_3$]$^{2+}$, 12.6 mM Na$_2$S$_2$O$_8$, 67 µM 1-V2, 80 mM sodium borate buffer (initial pH 9.0), illumination for 50 min; the TON in this reaction is ca. 35 with a chemical yield of around 37%, the reaction did not stop during test time period. Chemical shifts relative to pure VOCl$_3$ at 25° C. (0 ppm).
Figure 7:
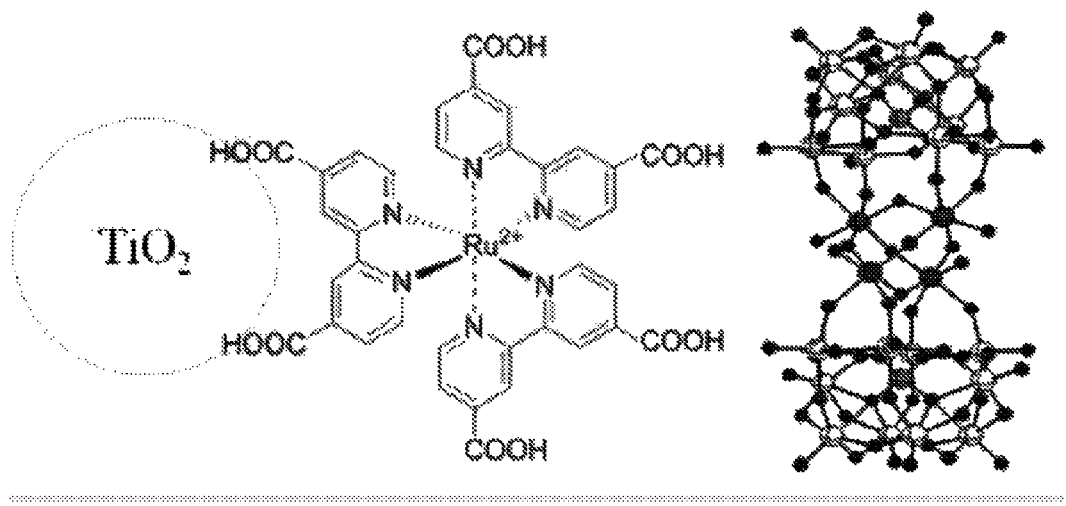
FIG. 7 illustrates covalent or hydrogen bonding of a photosensitizer, tris ruthenium complex, to an electrode comprised of a metal oxide semiconductor, TiO$_2$, and a water oxidation catalyst, a tetra-cobalt oxide cluster with VW$_9$O$_{34}$ ligands.

The activity of 1-V2 was also assessed by the standard approach using [Ru(bpy)$_3$]$^{2+}$ as a photosensitizer and persulfate as a sacrificial electron acceptor (FIG. 5). The O$_2$ yield in the presence of 1-V2 is twice as high as that using 1-P2 (FIG. 3), and the quantum efficiency of O$_2$ formation at 6.0 µM 1-V2 is ca. 68%. The O$_2$ yield and turnover number (TON) depend on catalyst concentration. Extrapolation to high catalyst concentrations gives O$_2$ yields per persulfate up to 80% and 45% for 1-V2 and for 1-P2, respectively.

While 1-P2 is hydrolytically stable in phosphate buffer up to pH 7.5-8.0 at low catalyst concentrations, it forms cobalt oxide at higher 1-P2 concentrations at pH 8 in the presence of highly oxidizing anodes. Phosphate decomposes 1-P2, and in non-phosphate buffers (borate and CAPS) this complex is stable as high as pH 10. A water oxidation catalyst that has hydrolytic stability in strongly basic solutions would be of value. The stability of 1-V2 was evaluated. 1-V2 shows no degradation over a range of conditions. After 24 h no apparent changes in the UV-vis spectra are observed in water or in borate buffer. $^{51}$V NMR spectra of 1-V2 in D$_2$O or in borate buffer at pH 9.0 show no changes over a period of one month. In addition, at elevated temperatures up to 80° C. the $^{51}$V NMR spectra in borate buffer have only one singlet peak consistent with a stable 1-V2. More significantly, two spectroscopic methods, FT-IR and $^{51}$V NMR (FIG. 8), indicate no change in 1-V2 before versus after catalysis.

Studies were conducted to probe the electronic structure of 1-V2 and to seek rationalization for the much higher reactivity of 1-V2 versus 1-P2 and other soluble WOCs. DFT calculations reveal that (a) the ground electronic state (optimized in the gas phase) of 1-V2 is 13 A with four Co$^{2+}$ centers, (b) its highest single occupied molecular orbitals are mainly composed of the d-orbitals of Co centers (with some mixing of O-atomic orbitals of the {VW$_9$O$_{34}$} units) followed by doubly occupied oxygen orbitals of {VW$_9$O$_{34}$} units and doubly occupied Co atomic orbitals, and (c) the lowest unoccupied orbital of 1-V2 contains mainly the VO$_4$ orbitals with some mixture from the Co$_4$O$_x$ belt. No analogous orbital is possible in 1-P2. The calculated important bond distances are in good agreement with their X-ray crystallographic values. The UV-vis spectrum of 1-V2 reveals transitions involving orbitals with both cobalt and heteroatom (vanadium) character in aqueous solution or 80 mM borate buffer whereas 1-P2 does not. The ligand-to-metal charge transfer (LMCT) and d-d transitions for 1-V2 are at 400 nm (ε400=1323 M−1 cm−1) and 580 nm (ε580=158 M−1 cm−1) respectively; whereas those for 1-P2 are at 570 nm (ε580=158 M−1 cm−1). The susceptibility of both compounds is primarily determined by the single-ion effects of the octahedrally coordinated, thus orbitally degenerate, Co(II) sites ($^4$T$_1$, S=3/2) as well as weak exchange interactions between these four centers, mediated by two µ-O bridges per Co . . . Co contact. The pronounced maxima in χ$_m$T at 4.8 K (1-V2) and 8.0 K (1-P2) stem from minor differences in the frontier orbitals of the µ-O bridges that translate into different coupling energies: whereas all nearest-neighbor interactions in 1-V2 are ferromagnetic (J$_1$=+2.10 cm$^{-1}$; J$_2$=+0.71 cm$^{-1}$), both ferromagnetic (J$_2$=+2.41 cm$^{-1}$) and weak antiferromagnetic (J$_1$=0.04 cm$^{-1}$) coupling is found for 1-P2. The overall single-ion ligand field splittings of the $^4$T$_1$ ground state in 1-V2 and 1-P2 are 1332 vs. 1166 cm$^{-1}$, respectively.

Perhaps most revealing feature of 1-V2 is that kinetic analysis shows that both the ground state redox potential of the most oxidized couple for 1-V2 is ca 50 mV lower than that of 1-P2, but the TOF$_{max}$ is almost twice as high. This combination of potentials and TOF$_{max}$ explains why 1-V2 is faster than 1-P2.

Electrode Devices

An electrochemical cell typically refers to a device capable of deriving electrical energy from chemical reactions as opposed to combustion. An electrochemical cell may also produce a gas, e.g., oxygen, hydrogen, methane, or combinations using electrical energy optionally supplemented with catalyzed photochemical reactions. An electrochemical cell typically contains two electrodes in an electrolyte. The two electrodes may use the same electrolyte, or they may use different electrolytes compartmentalized by a semipermeable membrane.

In certain embodiments, the disclosure relates to electrodes and light driven electrochemical cells comprising water oxidation catalysts disclosed herein. An example of a light driven electrochemical cell is shown in FIG. 1. See Huang et al., Ind. Eng. Chem. Res. 2012, 51, 11850-11859. At the first electrode, a light sensitive photosensitizer transfers an electron to a nano/mesoporous semiconductor metal oxide (SMO) supported on a transparent conductive substrate. Meanwhile, the hole left behind in the photosensitizer sequentially oxidizes the attached water oxidation catalyst (WOC) for the catalytic conversion of water to oxygen. This triadic anode is connected to an external circuit, such that the photoinjected electron can be removed from the anode and transported to the cathode for H$_2$O reduction in the production of H$_2$. In some cases, narrow-band semiconductor metal oxides (α-Fe$_2$O$_3$, doped TiO$_2$, WO$_3$, etc.) are introduced which may act as both the light absorber and the charge separation center. Inserting a proton exchange membrane allows transfer of hydrogen ions/protons. A pH difference across the two sides of the membrane results in a chemiosmotic potential or proton motive force. At the second electrode comprising Pt, water can be reduced to produce hydrogen. For certain embodiments of this disclosure, a typical water reduction catalyst (WRC) is Pt or carbon-supported Pt (Pt/C) nanoparticles. Within certain embodiments, other metal combinations and platforms are contemplated such as Pt-based bi- and tri-metallic electrocatalysts, such as alloying Pt with 3d-transition metals, including Fe, Co, Ni, Cu, Cr, and Mn; monolayer coating of Pt on suitable metal nanoparticles; Co$_3$O$_4$ nanocrystals grown on graphene oxide; carbon nanotube-graphene complexes; carbon-supported Pt$_3$Co nanoparticles, core-shell structured Pt—Co nanoparticles, composed of Pt$_3$Co ordered intermetallic cores with 2-3-atomic-layer Pt shells. See Wang et al., Nat Mate, 2013, 12:81-7.

For certain embodiments of this disclosure, a typical photosensitizer is a ruthenium complex comprising a nitrogen based ligand, quantum dot, or other metallic nanostructure. In certain embodiments, the ruthenium complex is Ru(bpy)(mcb)$_2$$^{2+}$ (bpy=2,2'-bipyridine, mcb=a carboxylic acid derivative of 2,2'-bipyridine), Re(CO)$_3$Cl(dcbpy) (dcbpy=4,4'-dicarboxy-2,2'-bipyridine). In certain embodiments, the disclosure contemplates a photosensitizer that is a quantum dot of a CdSe or CdS core with a ZnS coating or a CdSe core CdS coating followed by a ZnS coating, i.e., CdSe/CdS/ZnS. In certain embodiments, the disclosure contemplates an electrode comprising a photosensitizer that is a quantum dot of with core or coating layers of CdSe, CdTe, CdS, CdTe, HgTe, ZnS, ZnTe, InP, InAs, PbS, PbSe, PbTe, In$_2$O$_3$, TiO$_2$, or combinations thereof.

Youngblood et al. report a light-absorbing dye-sensitive photo-electrochemical cell using (4,4'-dimethyl-2,2'-bipyridyl)-(4,4'-bis(diethoxyphosphonyl)-2,2'-bipyridyl)(4-methyl-4'-dimethoxymalonyl-2,2'-bipyridyl)ruthenium. See JACS, 2009, 131, 926-927. In certain embodiments, the disclosure contemplates an electrode comprising a photosensitizer that is (4,4'-dimethyl-2,2'-bipyridyl)-(4,4'-bis(diethoxyphosphonyl)-2,2'-bipyridyl)(4-methyl-4'-dimethoxymalonyl-2,2'-bipyridyl)ruthenium covalently or non-covalently bonded to a water oxidation catalyst disclosed herein. In certain embodiments, the disclosure contemplates an photo-electrochemical cell comprising an first electrode comprising a metal oxide film, such as $TiO_2$, conjugated to a photosensitizer that is (4,4'-dimethyl-2,2'-bipyridyl)-(4,4'-bis(diethoxyphosphonyl)-2,2'-bipyridyl)(4-methyl-4'-dimethoxymalonyl-2,2'-bipyridyl)ruthenium and a water catalyst disclosed herein, and a second electrode comprising a water reduction catalyst, e.g., Pt or Pt nanoparticles on carbon.

Zhu et al. report light-driven redox mediator reduction using a ruthenium complex, quantum dots, and multicomponent metallic nanostructures, e.g., CdSe quantum dots, CdSe/CdS core/shell quantum dots, CdS nanorods, and CdSe/CdS dot-in-rod structures. See J. Am. Chem. Soc. 2012, 134, 11701-11708. In certain embodiments, photosensitizers herein are contemplated to be multicomponent nanostructures such as CdS nanorods and CdSe/CdS dot-in-rod structures.

Multicomponent metallic nanostructures can be prepared via multistep syntheses where presynthesized cores are used as seeds for nucleation and growth of other inorganic phase. See Talapin et al., Chem. Rev., 2010, 110 (1), pp 389-458. One can synthesis of core-shell quantum dots by combining two different semiconductors, metals, or a metal and a semiconductor in the form of a concentric core and shell, e.g., quantum dots of CdSe/ZnS, InAs/ZnSe, and InP/ZnS. Multicomponent nanostructures can range from covered core-shells, nanorods, tetrapods, and dumbbells. In certain embodiments, photosensitizers of quantum dots or multicomponent nanostructures may linked together into a material by ligands such as hydrazine, phenylene-diamine, hydrocarbon molecules with anchoring end groups, e.g., SH, $CO_2H$, $NH_2$, $PO(OH)_2$, and metal chalcogenide complexes (MCCs) such as Zintl ions (e.g., $SnS_4^{4-}$, $Sn_2Se_6^{4-}$, $In_2Se_4^{2-}$, $Ge_4S_{10}^{4-}$) and one-dimensional metal chalcogenide chains solvated by hydrazinium cations and/or neutral hydrazine molecules (e.g., $(N_2H_4)_2ZnTe$).

In certain embodiment, the disclosure relates to power generators comprising a light driven electrochemical cell that produces hydrogen and a hydrogen fuel cell such as a proton exchange membrane fuel cell. Hydrogen is fuel for the generation of power in hydrogen based fuel cells. A hydrogen fuel cell uses hydrogen as its fuel and oxygen as an oxidant. A proton exchange membrane fuel cell, also known as a polymer electrolyte membrane (PEM) fuel cell (PEMFC), contains a polymer between the anode and cathode. Each electrode has an electrocatalyst layer, and a gas diffusion layer (GDL). The catalyst layers can be attached to either the membrane or at times to the GDL material (termed the gas diffusion electrode, GDE). PEMFC electrocatalyst layers are usually composite structures consisting of proton-conducting ionomer material and noble-metal (platinum) catalyst supported on carbon. Typically, the electrocatalysts are nanoparticles of platinum or platinum alloys deposited on high-surface area carbon supports.

A typically proton permeable membrane is a polymer of monomers or mixed monomers with a fluorinated hydrocarbons and hydrogen bonding groups such as perfluorovinyl ether groups terminated with sulfonate groups onto a tetrafluoroethylene backbone, e.g., Nafion™. Sulfonic acid groups impart acidic characteristics facilitating hydrogen ion transfer. The polymer allows for transfer of hydrogen ions but not electrons. A stream of gaseous fuel, such as hydrogen is delivered to the anode side of the membrane electrode assembly. At the anode side the fuel is catalytically split into hydrogen ions and electrons. A stream of oxygen is delivered to the cathode side, and the oxygen is catalytically transformed into water from the hydrogen ions passing through the membrane. Because the electrolyte membrane is insulating, a voltage difference results between the electrodes.

In certain embodiments, the disclosure relates to power generators comprising a light driven electrochemical cell that produces hydrogen and a hydrogen fuel cell wherein the fuel cell comprises an electrode that is a porous gas-diffusion electrode. Typically, the electrode is impregnated with a polymer made from perfluorovinyl ether groups terminated with sulfonate groups. See Lee & Pyun, Journal of The Electrochemical Society, 2008, 155 (12) B1274-B1280, hereby incorporated by reference.

In certain embodiments, this disclosure contemplates a light driven electrochemical cell that is configured around an optical fiber. See Weintraub et al., Angew. Chem. Int. Ed., 2009, 48, 8981-8985. The first electrode is coated around the surface of the optical fiber, the coating around the first electrode is further impregnated with or conjugated to a photosensitizer such as a, ruthenium complex, quantum dot, or other metallic nanostructure. The second electrode is a second coating separated by the first electrode by an electrolyte and/or a membrane, proton permeable membrane, e.g., a polymer made from perfluorovinyl ether groups terminated with sulfonate groups.

EXAMPLES

Synthesis of $Na_{10}[Co_4(H_2O)_2(VW_9O_{34})_2]\cdot 35H_2O$ ($Na_{10}$ 1-V2), and $K_{10}[Co_4(H_2O)_2(VW_9O_{34})_2]$ ($K_{10}$ 1-V2)

$Na_{10}[Co_4(H_2O)_2(VW_9O_{34})_2]\cdot 35H_2O$ ($Na_{10}$ 1-V2) was synthesized as follows: $Co(NO_3)_2\cdot 6H2O$ (1.2 g) and $Na_2WO_4\cdot 2H_2O$ (6.0 g) were dissolved in 0.5 M sodium acetate buffer (120 mL, pH 4.8) and vigorously stirred for about 5 minutes before $NaVO_3$ (0.27 g) was added. The resulting turbid mixture was then heated to 80° C. for 2 hours. The hot brown mixture was filtered to remove any precipitate and left to crystallize for around one week to give dark block crystals of 1-V2, a single crystal of which was submitted to structural analysis by X-ray crystallography and the bulk sample analyzed by elemental analysis (yield 0.72 g; ca. 12.5% based on tungstate). Elemental Analysis, Calcd (Found %) for $Na_{10}$ 1: calc for Co, 4.21; V, 1.82; W, 59.14; found for Co, 4.09; V, 1.80; W, 60.7. FT-IR ($cm^{-1}$): 3400(br), 1610(s), 960(m), 890(s), 820(s), 755(sh), 700(s), 520(sh), 485(m). UV-Vis ($M^{-1}$ $cm^{-1}$ in water): $\epsilon 400=1323$; $\epsilon 580=158$. $^{51}V$ NMR: 120.8 ppm, $\Delta v\frac{1}{2}=30.5$ Hz.

The $K^+$ salt, $K_{10}[Co_4(H_2O)_2(VW_9O_{34})_2]$ ($K_{10}$ 1-V2), was obtained by using all potassium-containing precursors and following the same procedure as above. The single crystal X-ray structure was solved.

Kinetics of Stoichiometric Water Oxidation by $[Ru(Bpy)_3]$ 3+, Fittings and Turnover Frequency (TOF).

The rapid kinetics for dark water oxidation in eq 1s was monitored using a Hi-Tech Stopped Flow SF-61SX2 instrument equipped with a diode array detector (400-700 nm).

One of the feeding syringes was filled with a solution of $[Ru(bpy)_3]^{3+}$ and the second with a freshly prepared buffered solution of the catalyst. The consumption of $[Ru(bpy)_3]^{3+}$ was followed by a decrease in absorbance at 670 nm ($\epsilon 670=4.2\times 10^2$ $M^{-1}$ $cm^{-1}$) with optical path length l=10 mm. The data were acquired and treated using KinetAsyst™ 3.0 software.

$$4[Ru(bpy)_3]^{3+} + 2H_2O \rightarrow 4[Ru(bpy)_3]^{2+} + O_2 + 4H+ \quad (1s)$$

The TOF reported in the main text is defined as the ratio of initial rate per catalyst concentration, which is the same as TON per second or TOF=d(TON)/dt. This definition follows the common practice of the field. In this case, TOF appears as an experimental-condition-dependent quantity and does not characterize the catalytic activity of a given material. The basic mechanism of photosynthetic water oxidation consists of at least five different reactions, known as the classical Kok cycle. The reaction mechanism in eqs 2s-6s were use, which is kinetically analogous to the Kok cycle. The number in the name "cat(number)" denotes the number of oxidizing equivalents above the resting oxidation state of the catalyst which entails four Co(II) centers.

$$cat(3) + [Ru(bpy)_3]^{3+} = cat(4) + [Ru(bpy)_3]^{2+} \quad (2s)$$

$$cat(4) \rightarrow O2 + cat(0) \quad (3s)$$

$$cat(0) + [Ru(bpy)_3]^{3+} \rightarrow cat(1) + [Ru(bpy)_3]^{2+} \quad (4s)$$

$$cat(1) + [Ru(bpy)_3]^{3+} \rightarrow cat(2) + [Ru(bpy)_3]^{2+} \quad (5s)$$

$$cat(2) + [Ru(bpy)_3]^{3+} \rightarrow cat(3) + [Ru(bpy)_3]^{2+} \quad (6s)$$

The eqs 2s-6s were used to fit the data with $k_{2s}$, $k_{-2}$, $k_{3s}$, and $[[Ru(bpy)_3]^{2+}]o$ as variable parameters. The fitting was performed by "GEPASI 3.30" software. The fitting gives $k_{3s}$ for 1-V2 equal≈$5\times 10^3$ $s^{-1}$ and $K_{2s}$≈0.15. Thus, the reaction in eq 2s is thermodynamically unfavorable by ≈50 mV. The standard oxidation potential of $[Ru(bpy)_3]^{3+}/[Ru(bpy)_3]^{2+}$ is 1.26 V (NHE), thus the potential of cat(4)/cat(3) couple for 1-V2 is ~1.3 V (NHE). In the Kok cycle the slowest step is the conversion of $S_3$ state to $S_0$ state with τ½~1.1 ms 7. The overall rate of $O_2$ formation and TOF increases with a photon flux and then reaches a plateau. On this plateau all the catalyst is present in the S3 state, and the reaction rate law is $d[O_2]/dt=(1/τ½)[S_3]$, and $TOF_{max}=(1/τ½)$~$10^3$ $s^{-1}$. For the reaction in eqs 2s-6s catalyzed by 1-V2, the TOF depends on $[Ru(bpy)_3]^{3+}/[Ru(bpy)_3]^{2+}$ ratio. In the light driven system with persulfate as a sacrificial electron acceptor, the $[Ru(bpy)_3]^{3+}$ oxidant is generated from $[Ru(bpy)_3]^{2+}$ photochemically. In this case, the TOF increases with light intensity and persulfate concentration. Extrapolation to high photon fluxes and persulfate concentrations gives $TOF^{max}$≈$4.8\times 10^3$ $s^{-1}$, which is consistent with the rate constant $5\times 10^3$ $s^{-1}$. The TOF calculated from the initial rate of $[Ru(bpy)_3]^{3+}$ consumption is ca. $1.1\times 10^3$ $s^{-1}$, which is only 4 times lower than $TOF_{max}$ estimated above. This example demonstrates that TOF simply defined as d(TON)/dt is indeed concentration dependent and should be used with caution when comparing the activity of catalysts.

The similar fitting of data for 1-P2 at pH 9 gives $k_{3s}$≈3×$10_3$ s-1, which is lower than for 1-V2. The roughly estimated $K_{2s}$ value for 1-P2 is ≈$3\times 10^{-2}$, which implies that the standard redox potential of cat(4)/cat(3) couple for 1-P2 is 0.1V higher than that of $[Ru(bpy)_3]^{3+}/[Ru(bpy)_3]^{2+}$ couple and is ~1.36 V. These numbers explain why 1-V2 is more active.

The splitting of water to $O_2$ and $H_2$ in eq 7s requires a consumption of energy equivalent to 1.23 eV per electron. This pH-independent potential is a sum of the two half reactions that are both pH dependent.

$$2H_2O \rightarrow 2H_2 + O_2 \quad (7s)$$

It was assume in eq 7s that $H_2$ formation is not the rate-limiting step and proceeds without overpotential. The efficiency of the polyoxometalate WOC or the OEC to form $O_2$ can be defined either as the maximal rate of $O_2$ production ($TOF_{max}$) or as the overpotential required to reach a certain value of TOF. In PSII, a tyrosine radical serves as an oxidant with E°=1.13-1.23 V (a mean value 1.18 V). In PSII, the maximal (lumenal) proton concentration corresponds to pH 4.2. At this pH the thermodynamic potential for water oxidation is ~0.97 V. Thus, the OEC is functioning at very low overpotential, 1.18-0.97~0.2 V. The 1-V2 is an efficient catalyst at pH 9.0, where the thermodynamic potential for water oxidation is ~0.7 V. The reactive species in the 1-V2 case has a standard potential ~1.3 V. For efficient functioning an additional overpotential of about 0.2 V should be added. Thus, in order to split water in the 1-V2 system the potential (1.23+0.7+0.2)=2.13 V should be applied. The factor of 0.2 derives from the reaction assuming to proceed to 99.9% conversion. In order to split water the OEC requires the potential (1.23+0.18)=1.41 V. So, the 1-V2 catalyst works with a maximum speed at potentials>2.13 V, which is 0.72 V higher than for the OEC. Thus, the 1-V2 is faster but less energy efficient compared to the OEC. It would be interesting to estimate the required potentials for the 1-V2 system at which it works with the same TOF as $TOF_{max}$~$10^3$ $s^{-1}$ for OEC. In the 1-V2 system, the TOF is reached at $[Ru(bpy)_3]^{3+}/[Ru(bpy)_3]^{2+}$ ratio about 2.0. In this case, in order to have TOF=$10^3$ $s^{-1}$ a potential of ~(1.23+0.56) V should be applied in the 1-V2 system. This is only 0.36 V higher than in OEC. The similar analysis shows that for 1-P2 system the potential 2.02 V should be applied which by 0.63 V higher than for OEC. Thus, the difference between potentials required to achieve TOF=$10^3$ $s^{-1}$ can be used to quantitatively compare the activity of WOCs under different experimental conditions. Based on this criterion the 1-V2 system is close to OEC. In the light-driven reactions, the TONs at 0.2 μM 1-V2 and 1-P2 are ~$4.2\times 10^3$ and $9.3\times 10^2$, respectively.

Light-driven Catalytic Experiments

The light-driven water oxidation reactions was conducted using a cylindrical cuvette (NSG, 32UV10) with a total volume of ~2.5 ml. The cell was filled with 2.0 ml of reaction solution with 1.0 mM $Ru(bpy)_3Cl_2.6H_2O$, 5.0 mM $Na_2S_2O_8$, 0.2-6.0 μM catalysts (in 80 mM sodium borate buffer (initial pH 9.0). The reaction cell was sealed with a rubber septum, carefully deairated and filled with Ar. Procedures were performed with a minimum exposure to ambient light. The reaction was initiated by turning on the LED-light source (λ=455 nm; light intensity 17 mW, beam diameter ~0.4 cm). A magnetically-coupled stirring system (SYS 114, SPECTROCELL) was used to mix reaction solutions ($4\times 10^3$ RPM). The $O_2$ concentration in the headspace was quantified by GC. The solution pH was measured after the reaction.

Analysis of dioxygen in the reaction headspace was performed using a computer controlled Agilent 6850 model gas chromatograph equipped with a thermal conductivity detector and a HP-MOLESIEVE capillary GC column (30 m×0.535 mm×25.00 μm) Argon was used as a carrier gas. Typically, the $O_2$ yield was quantified by withdrawing a gas sample from the headspace without stopping the reaction.

Contamination of the head-space with air was corrected by quantification of $N_2$ present in the head-space (from the $N_2$ peak in the GC traces).

The invention claimed is:

1. A composition comprising,
   a) water,
   b) a complex of a tetra-metal oxide cluster and $VW_9O_{34}$ ligands, and
   c) a photosensitizer.

2. The composition of claim 1, wherein metal is Co.

3. The composition of claim 1, wherein the photosensitizer is a ruthenium complex, quantum dot, or other metallic nanostructure.

4. The composition of claim 3, wherein the ruthenium complex comprises a tris-bidentate ligand complex.

5. The composition of claim 1, further comprising a compound that acts as an electron acceptor.

6. The composition of claim 5, wherein the electron acceptor is persulfate.

7. An electrochemical cell comprising:
   a) a first electrode,
   b) a photosensitizer,
   c) a complex of a tetra-metal oxide cluster and $VW_9O_{34}$ ligands, and
   d) a second electrode.

8. The electrochemical cell of claim 7, wherein metal is Co.

9. The electrochemical cell of claim 7, wherein the first electrode comprises a semiconductor metal oxide.

10. The electrochemical cell of claim 9, wherein the semiconductor metal oxide comprises $TiO_2$, $Fe_2O_3$, or $WO_3$.

11. The electrochemical cell of claim 7, wherein the second electrode comprises a water reduction catalyst.

12. The electrochemical cell of claim 7, wherein the photosensitizer is ruthenium complex, quantum dot, nanostructure, or multicomponent nanostructure.

13. The electrochemical cell of claim 12, wherein the ruthenium complex is a tris-bidentate ligand complex.

14. A method of oxidizing water comprising exposing a composition comprising:
   a) water,
   b) a complex of a tetra-metal oxide cluster and $VW_9O_{34}$ ligands, and
   c) a photosensitizer,
   to light under conditions such that oxygen is formed.

15. The method of claim 14, wherein oxygen and hydrogen are formed.

16. A process for preparing a complex of a tetra-metal oxide cluster and $VW_9O_{34}$ ligands comprising mixing $M(NO_3)_2$, $WO_4^{2-}$ salts and $VO_3^-$ salts, under conditions such that of a tetra-metal oxide cluster and $VW_9O_{34}$ ligands is formed wherein M is a metal.

17. The process of claim 16, wherein M is Co.

* * * * *